United States Patent
Wang et al.

(10) Patent No.: US 8,979,348 B2
(45) Date of Patent: Mar. 17, 2015

(54) BACKLIGHT MODULE AND LIGHT SOURCE MODULE THEREOF

(71) Applicant: AU Optronics Corporation, Hsin-Chu (TW)

(72) Inventors: Cheng-Yu Wang, Hsin-Chu (TW); Ci-Guang Peng, Hsin-Chu (TW); Cheng-Min Tsai, Hsin-Chu (TW); Te-Hen Lo, Hsin-Chu (TW); Ming-Sheng Lai, Hsin-Chu (TW); Ren-Wei Huang, Hsin-Chu (TW); Shu-Ting Jhuang, Hsin-Chu (TW); Yu-Chin Wu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 260 days.

(21) Appl. No.: 13/660,036

(22) Filed: Oct. 25, 2012

(65) Prior Publication Data
US 2013/0128619 A1   May 23, 2013

(30) Foreign Application Priority Data
Nov. 18, 2011   (TW) .............................. 100142362 A (51) Int. Cl.
*F21V 8/00* (2006.01)
*G02B 6/43* (2006.01)
(Continued)

(52) U.S. Cl.
CPC ..... *G02F 1/133615* (2013.01); *F21Y 2103/003* (2013.01); *F21Y 2105/005* (2013.01)
USPC .................. 362/613; 362/249.04; 362/249.08; 362/612; 362/631

(58) Field of Classification Search
CPC ................... G02F 1/133615; F21Y 2103/003; F21Y 2105/005
USPC ........ 362/249.04, 249.08, 612, 613, 630, 631
See application file for complete search history.

(56) References Cited

U.S. PATENT DOCUMENTS 6,913,366 B2   7/2005   Lee
7,237,936 B1 *   7/2007   Gibson ........................ 362/547
(Continued)

FOREIGN PATENT DOCUMENTS

CN   1437056 A   8/2003
CN   101672446 A   3/2010
(Continued)

OTHER PUBLICATIONS

English translation of abstract and pp. 4-7 of the specification of CN 101672446 A (published Mar. 17, 2010).
(Continued)

*Primary Examiner* — Alan Cariaso
(74) *Attorney, Agent, or Firm* — McClure, Qualey & Rodack, LLP (57) ABSTRACT

A backlight module and a light source module thereof are disclosed. The light source module includes a substrate, at least one first light source, and at least one second light source. The substrate includes a first substrate portion and a second substrate portion. The first substrate portion extends along a length direction, and the second substrate portion bends an acute angle corresponding to an extending surface of the first substrate portion. The at least one first light source and the at least one second light source are disposed on the first substrate portion and the second substrate portion respectively. The acute angle is existed between the light-emitting directions of the first light source and the second light source, and the light-emitting directions are parallel to the first substrate portion.

20 Claims, 8 Drawing Sheets

(51) Int. Cl.
*G02F 1/1335* (2006.01)
*F21Y 103/00* (2006.01)
*F21Y 105/00* (2006.01)

(56) References Cited

U.S. PATENT DOCUMENTS

| | | | |
|---|---|---|---|
| 7,350,955 B2* | 4/2008 | Chang et al. | 362/612 |
| 7,570,321 B2* | 8/2009 | Takahashi et al. | 349/65 |
| 7,591,579 B2* | 9/2009 | Yeom | 362/613 |
| 8,057,087 B2* | 11/2011 | Chang | 362/621 |
| 8,100,573 B2* | 1/2012 | Kim et al. | 362/612 |
| 8,215,795 B2* | 7/2012 | Pichel | 362/249.02 |
| 8,506,151 B2* | 8/2013 | Park | 362/613 |
| 8,579,491 B2* | 11/2013 | Kang et al. | 362/621 |
| 2003/0147257 A1 | 8/2003 | Lee | |

FOREIGN PATENT DOCUMENTS

| | | |
|---|---|---|
| JP | 2001-143519 | 5/2001 |
| JP | 2003-281917 | 10/2003 |
| TW | 200302944 | 8/2003 |
| TW | 201118470 | 6/2011 |

OTHER PUBLICATIONS

English translation of abstract of JP 2003-281917.
English translation of abstract of JP 2001-143519.
English translation of abstract of TW 201118470.

* cited by examiner

BACKLIGHT MODULE AND LIGHT SOURCE MODULE THEREOF

BACKGROUND

1. Technical Field

The disclosure relates to a liquid crystal display; in particular, to a backlight module and a light source module thereof capable of effectively improving the insufficient brightness in the middle region of the liquid crystal display.

2. Description of the Prior Art

In recent years, with the continuous progress of display technology, the liquid crystal display is mass produced and widely used. It is no doubt that the liquid crystal display has become the mainstream of the flat panel display technology. In the liquid crystal display, the backlight module providing the backlight source needed in the LCD plays a very important role.

In general, the LED light-bar formed by a plurality of LEDs is disposed in the backlight module of the LCD to provide the backlight source needed in the LCD. In practical applications, the LEDs on the LED light-bar can be arranged in different types, for example, a type of linear arrangement or a type of corner lighting arrangement.

Figure 1:
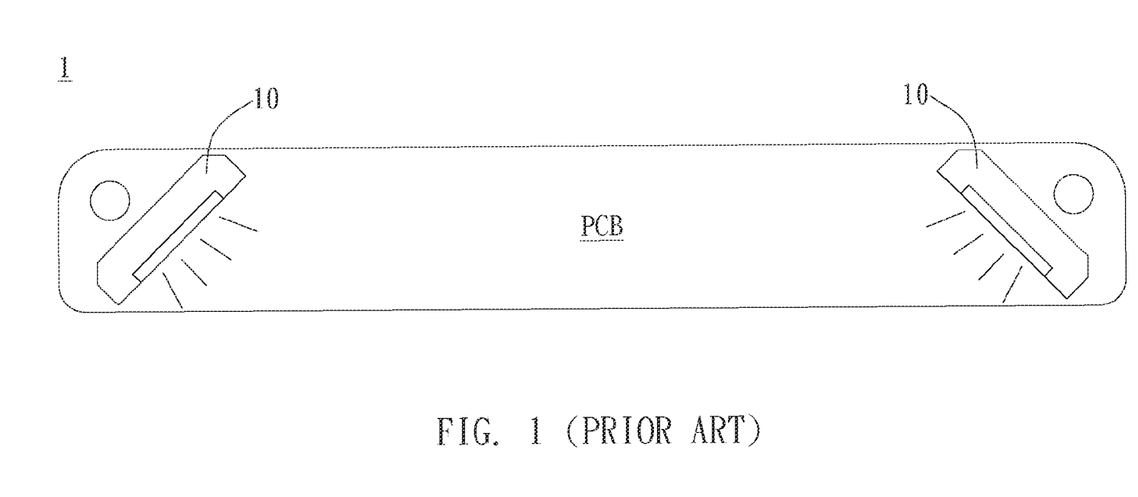
FIG. 1 illustrates a schematic diagram of the side-view LED of the conventional LED light-bar disposed at an end position of the printed circuit board.
Figure 2:
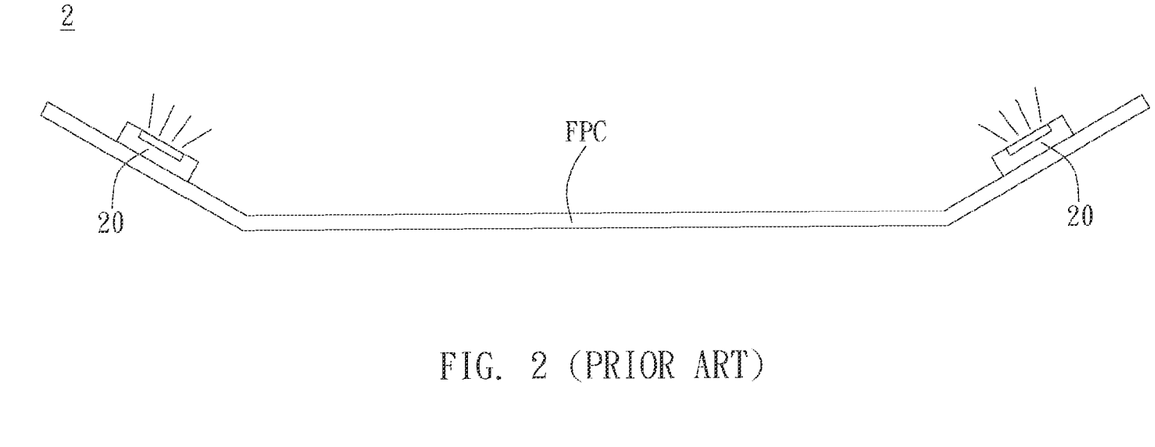
FIG. 2 illustrates a schematic diagram of the top-view LED of the conventional LED light-bar disposed at an end position of the flexible circuit board.

Please refer to FIG. 1 and FIG. 2. FIG. 1 illustrates a schematic diagram of the side-view LED of the conventional LED light-bar disposed at an end position of the printed circuit board; FIG. 2 illustrates a schematic diagram of the top-view LED of the conventional LED light-bar disposed at an end position of the flexible circuit board. As shown in FIG. 1 and FIG. 2, no matter in the LED light-bar 1 of FIG. 1 or in the LED light-bar 2 of FIG. 2, the arrangement of the side-view LED 10 on the printed circuit board PCB and the arrangement of the top-view LED 20 on the flexible circuit board FPC both belong to the type of corner lighting arrangement. Because the side-view LED 10 and the top-view LED 20 are disposed at the end positions of the printed circuit board PCB and the flexible circuit board FPC respectively, the lights emitted from the side-view LED 10 and the top-view LED 20 are emitted into the light guiding plate from the corners of the light guiding plate, and it is hard to adjust the optical performance in the middle region of the backlight module. Therefore, dark regions are easily generated in the middle region of the screen display by the LCD.

SUMMARY

Therefore, the disclosure provides a backlight module and a light source module thereof to solve the above-mentioned problems occurred in the prior arts.

An embodiment of the invention is a backlight module. The backlight module includes a light guiding plate and a light source module. The light guiding plate has a light incident side and a corner area located at two ends of the light incident side. The light source module includes a substrate, at least one first light source, and at least one second light source. The substrate includes a first substrate portion and a second substrate portion. The at least one first light source and the at least one second light source are disposed on the first substrate portion and the second substrate portion respectively. The first substrate portion extends along a length direction, and the second substrate portion bends an acute angle corresponding to an extending surface of the first substrate portion. The acute angle exists between the light-emitting directions of the first light source and the second light source, and the light-emitting directions are parallel to the first substrate portion. The first substrate portion extends along the light incident side, and the first light source or the second light source generates lights incident to the light incident side; another generates lights incident to the corner area of the light guiding plate.

Another embodiment of the invention is a light source module. The light source module includes a substrate, at least one first light source, and at least one second light source. The substrate includes a first substrate portion and a second substrate portion. The at least one first light source and the at least one second light source are disposed on the first substrate portion and the second substrate portion respectively. The first substrate portion extends along a length direction, and the second substrate portion bends an acute angle corresponding to an extending surface of the first substrate portion. The acute angle exists between the light-emitting directions of the first light source and the second light source, and the light-emitting directions are parallel to the first substrate portion.

Another embodiment of the invention is a backlight module. The backlight module includes a light guiding plate and a light source module. The light guiding plate has a plate body and a wedged light incident unit connecting with a side of the plate body. The wedged light incident unit has the light incident side opposite to the light incident side. The width of the wedged light incident unit is decreasing from the light incident side to the plate body. The light source module includes a substrate, at least one first light source, and at least one second light source. The substrate includes a first substrate portion and a second substrate portion. The at least one first light source and the at least one second light source are disposed on the first substrate portion and the second substrate portion respectively. The first substrate portion extends along a length direction, and the second substrate portion bends an acute angle corresponding to an extending surface of the first substrate portion. The acute angle is existed between the light-emitting directions of the first light source and the second light source, and the light-emitting directions are parallel to the surface formed by a normal direction vertical to the second substrate and the length direction. The first substrate portion extends along the light incident side, and the second light source generates lights incident to the light incident side. The first light source generates lights incident to the corners of the light guiding plate at two sides of the light incident side. The second light source faces toward a thicker position in the wedged light incident unit; the first light source faces toward a thinner position in the wedged light incident unit.

Another embodiment of the invention is a light source module. The light source module includes a substrate, at least one first light source, and at least one second light source. The substrate includes a first substrate portion and a second substrate portion. The at least one first light source and the at least one second light source are disposed on the first substrate portion and the second substrate portion respectively. A light emitting surface of the second light source is parallel to the second substrate portion. The first substrate portion has a long side and a short side which are connected, and the second substrate portion can be disposed at the long side and the short side and can be bent relative to the first substrate portion.

Another embodiment of the invention is a backlight module. The backlight module includes a light guiding plate, a substrate, at least one first light source, and at least one second light source. The light guiding plate has a non-light incident side, a first light incident side, and a second light incident side, and the second light incident side is located between the first light incident side and the non-light incident side. The substrate includes a first substrate portion and a second substrate portion. The at least one first light source is disposed on the first substrate portion; the at least one second light source is disposed on the second substrate portion. The first substrate portion has a long side and a short side which are connected, and the second substrate portion can be disposed at the long side or the short side, and the second substrate portion can be bent relative to the first substrate portion. The first light source corresponds to the first light incident side, and the second light source corresponds to the second light incident side.

Compared to the prior art, the backlight module and its light source module according to the invention can effectively improve the insufficient brightness in the middle region of the conventional backlight module by using a side-view LED and a top-view LED mixedly or substrate combination. In addition, because the thinner top-view LED is used in the backlight module and its light source module of the invention, the value of A in the A/P ratio can be also increased, and the hot spot phenomenon formed by the LEDs due to the uneven intensity of incident lights.

The advantage and spirit of the invention may be understood by the following detailed descriptions together with the appended drawings.

DETAILED DESCRIPTION

A first embodiment of the invention is a light source module. In this embodiment, the light source module can include at least one LED light-bar formed by a plurality of LEDs, and the light source module is disposed in a backlight module of the LCD to provide the backlight source needed in LCD, but not limited to this. Next, the above-mentioned light source module will be introduced in detail.

Figure 3:
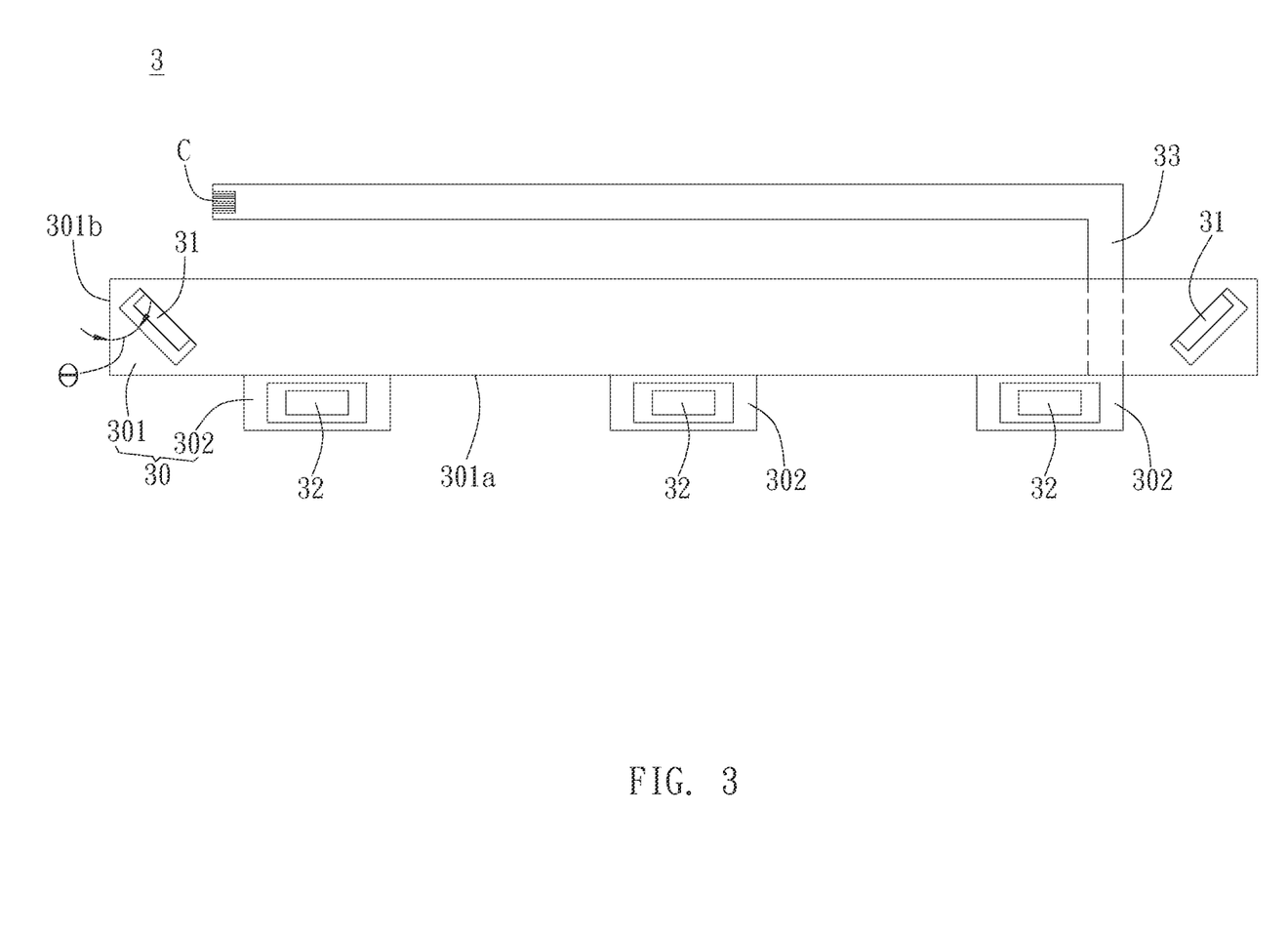
FIG. 3 illustrates a top view of the light source module in the first preferred embodiment of the invention.

Please refer to FIG. 3. FIG. 3 illustrates a top view of the light source module in the first embodiment of the invention. As shown in FIG. 3, the light source module 3 includes a substrate 30, a first light source 31, a second light source 32, and a signal connection unit 33, wherein the substrate 30 includes a first substrate portion 301 and a second substrate portion 302. The first substrate portion 301 extends along a length direction of the substrate 30, and the first substrate portion 301 has a long side 301a and a short side 301b which are connected. The first light source 31 is disposed on the first substrate portion 301, and the second light source 32 is disposed on the second substrate portion 302. The first light source 31 is disposed on a position of the first substrate portion 301 closer to an end of the short side 301b than the second substrate portion 302, and there is an acute angle θ (e.g., 45°) between the first light source 31 and the short side 301b. In this embodiment, the first light source 31 is disposed at an end of the first substrate portion 301, and the second light source 32 is correspondingly disposed at the central portion of the first substrate portion 301. For example, as shown in FIG. 3, the first light sources 31 are disposed at two ends of the first substrate portion 301, so that the second light source 32 is disposed between the first light sources 31. In this embodiment, there is an acute angle θ between the first light source 31 and the short side 301b. In other words, there are angles between the position of the first light source 31 and the long side 301a and between the position of the first light source 31 and the short side 301b respectively, as shown in FIG. 3, the angles are acute angles θ (e.g., 45°), but the invention is not limited to this, different angles can be disposed according to different light paths. The second substrate portion 302 is added to connect with the first substrate portion 301 in a hot pressing way, but not limited to this.

The signal connection unit 33 is formed by extending from the second substrate portion 302 to enhance the utility of the entire light source module 3. As shown in FIG. 3, the signal connection unit 33 passes under the first substrate portion 301 from one side to the other side to perform signal connection. In this embodiment, the signal connection unit 33 is connected with the circuit on the first substrate portion 301 through the second substrate portion 302 to transmit signal for the first substrate portion 301 and the second substrate portion 302 at the same time. The signal connection unit 33 has a connection end C used to couple to the external and receive signals.

In this embodiment, the second substrate portion 302 is disposed at the long side 301a of the first substrate portion 301, so that the position of the second substrate portion 302 corresponds to the central of the first substrate portion 301. In addition, in order to save the material cost, a plurality of small piece structures capable of bearing the second light source 32 are used in the second substrate portion 302, as shown in FIG. 3. But in fact, a single large piece structure capable of bearing a plurality of the second light sources 32 can be also used in the second substrate portion 302 to increase the composition utilization, but not limited to this.

It should be noticed that three second substrate portions 302 are added to connect with the first substrate portion 301 shown in FIG. 3; two first light sources 31 are disposed at the left side and the right side of the first substrate portion 301 respectively; three second light sources 32 are disposed on the three second substrate portions 302 respectively. However, in practical applications, the number of the second substrate portion 302 and the second light source 32 can be determined based on practical needs, it is not limited to this embodiment.

In addition, there are only first light sources 31 arranged equidistantly in this embodiment, but this invention is not limited to this. For example, the arrangement of the first light sources 31 can have different choices according to different designed light guiding plate distributions.

In this embodiment, it is preferred that the hard substrate, for example, the printed circuit board (PCB) with thickness of 0.4 mm, is used as the first substrate portion 301 to have better assembly. It is preferred that the flexible substrate, for example, the flexible printed circuit board (FPC) with thickness of 0.2 mm, is used as the second substrate portion 302. In addition, the flexible printed circuit board (FPC) can be used as the first substrate portion 301 and the printed circuit board (PCB) can be used as the second substrate portion 302. When different kinds of circuit board combinations are used for the first substrate portion 301 and the second substrate portion 302 as the examples mentioned above, the properties of assembly and easy bending of the substrate 30 can be taken into account simultaneously.

Figure 4A:
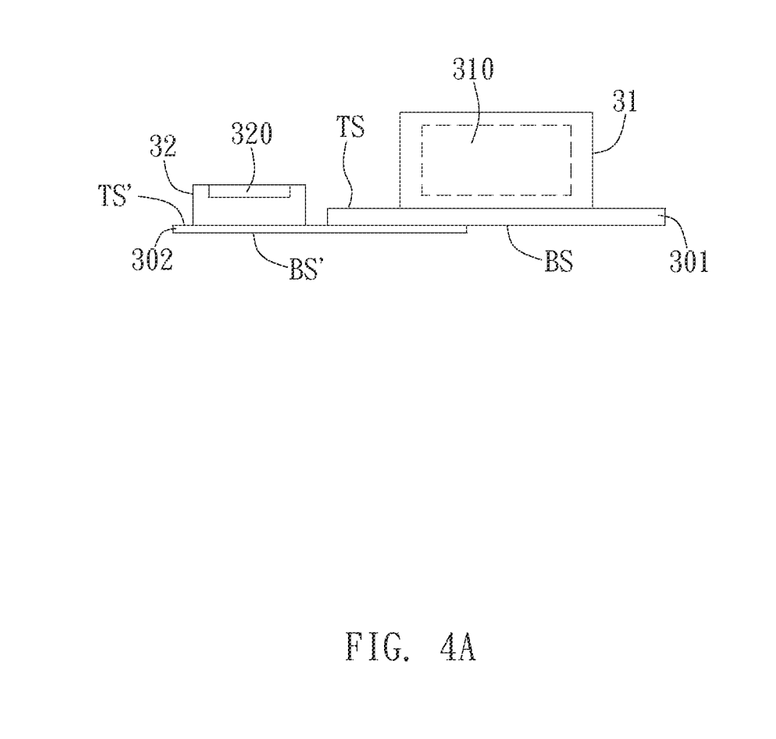
FIG. 4A illustrates a side view of the light source module shown in FIG. 3.
Figure 4B:
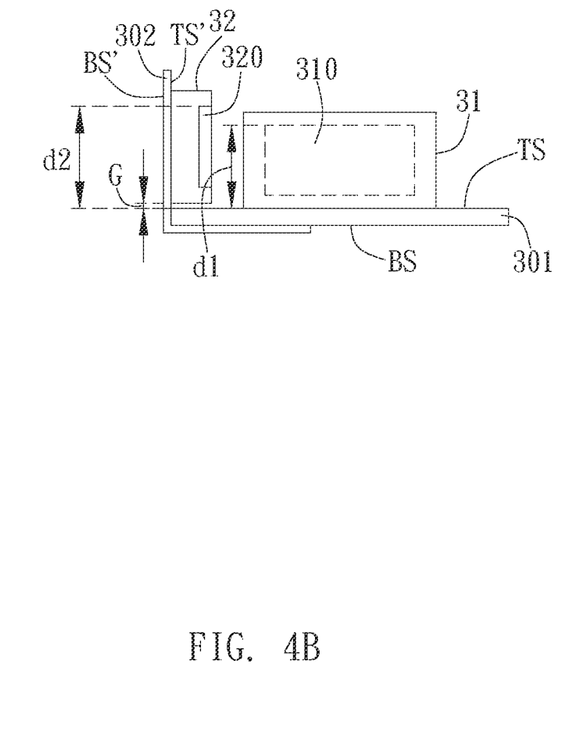
FIG. 4B illustrates a side view of the second substrate portion of FIG. 4A bent an angle relative to the first second substrate portion.

Please refer to FIG. 4A and FIG. 4B. FIG. 4A illustrates a side view of the light source module 3 shown in FIG. 3. FIG. 4B illustrates a side view of the second substrate portion 302 of FIG. 4A bent an angle relative to the first substrate portion 301. As shown in FIG. 4A and FIG. 4B, the second substrate portion 302 is added to connect with a bottom surface BS opposite to the first light source 31 of the first substrate portion 301, and bent in a L type as shown in FIG. 4B toward a top surface TS the first light source 31 disposed of the first substrate portion 301, but not limited to this. In this embodiment, it is preferred that the side-view LED is used as the first light source 31; that is to say, there is an angle between the extending direction of the light emitting surface 310 of the first light source 31 and the top surface TS of the first substrate portion 301, for example, the angle can be a right angle, but not limited to this. It is preferred that the top-view LED is used as the second light source 32, that is to say, the light emitting surface 320 of the second light source 32 disposed on the top surface TS' of the second substrate portion 302 is parallel to the top surface TS', but not limited to this.

As shown in FIG. 4B, the second substrate portion 302 is bent from the long side 301a of the first substrate portion 301 to stand on the bearing plate surface (i.e., the top surface TS) of the first substrate portion 301 for bearing the first light source 31, and the second light source 32 is also located above the bearing plate surface (the top surface TS). It should be noticed that there is a gap G between the second light source 32 and the bearing plate surface (the top surface TS), that is to say, the second light source 32 does not contact with the bearing plate surface (the top surface TS) to enhance the effect of dissipating the heat generated by the second light source 32, and the side surface of the light emitting surface 320 of the second light source 32 is adjacent to the bearing plate surface (the top surface TS). Because the second substrate portion 302 is bent relative to the first substrate portion 301, there is an angle between the light emitting direction of the first light source 31 disposed on the first substrate portion 301 and the light emitting direction of the second light source 32 disposed on the second substrate portion 302; that is to say, the angle exists between a normal of the light emitting surface 310 of the first light source 31 and a normal of the light emitting surface 320 of the second light source 32, and the light emitting directions of the first light source 31 and the second light source 32 are both parallel to the bearing plate surface (the top surface TS) of the first substrate portion 301. In fact, the angle between the light emitting direction of the first light source 31 and the light emitting direction of the second light source 32 can be an acute angle, but not limited to this.

It should be noticed that because the light emitting surface 320 of the second light source 32 is higher than the light emitting surface 310 of the first light source 31, and there is the gap G between the second light source 32 and the first substrate portion 301, the distance d2 between the top of the light emitting surface 320 of the second light source 32 and the bearing plate surface (the top surface TS) will be larger than the distance d1 between the top of the light emitting surface 310 of the first light source 31 and the bearing plate surface (the top surface TS), as shown in FIG. 4B. That is to say, the distance d2 can be larger than the distance d1 by adjusting the height that the second light source is disposed, namely by adjusting the gap G between the second light source 32 and the first substrate portion 301. With this design, even the first light source 31 and the second light source 32 have different sizes of light emitting surface, the height of the second light source 32 can be raised to coordinate different light guiding plate designs. In practical applications, the first substrate portion 301 and the second substrate portion 302 can tightly adhere to the light source frame of the backlight module (not shown in the figures), so that the heat dissipating effect can be enhanced by the conduction way.

In this embodiment, the second substrate portion 302 is connected with the bottom surface BS of the first substrate portion 301 by the hot pressing way; therefore, the effect caused by the second substrate portion 302 connected with the top surface TS of the first substrate portion 301 to the lights generated by the first light source 31 incident into the light guiding plate LGP can be avoided. For example, if the second substrate portion 302 is connected with the top surface TS of the first substrate portion 301, a part of lights from the first light source 31 may be blocked and failed to emit into the light guiding plate LGP. In addition, because the first substrate portion 301 is the hard substrate, it can assist the second substrate portion 302 (the flexible substrate) connected with the bottom surface BS of the first substrate portion 301 to be bent in the L type toward the top surface TS as shown in FIG. 4B.

The light source module 3 in this embodiment uses the side-view LED and the top-view LED mixedly to dispose the side-view LED at corners of the LED light-bar and dispose the top-view LED in the middle region to effectively improve the insufficient brightness in the middle region of the conventional backlight module.

Figure 5A:
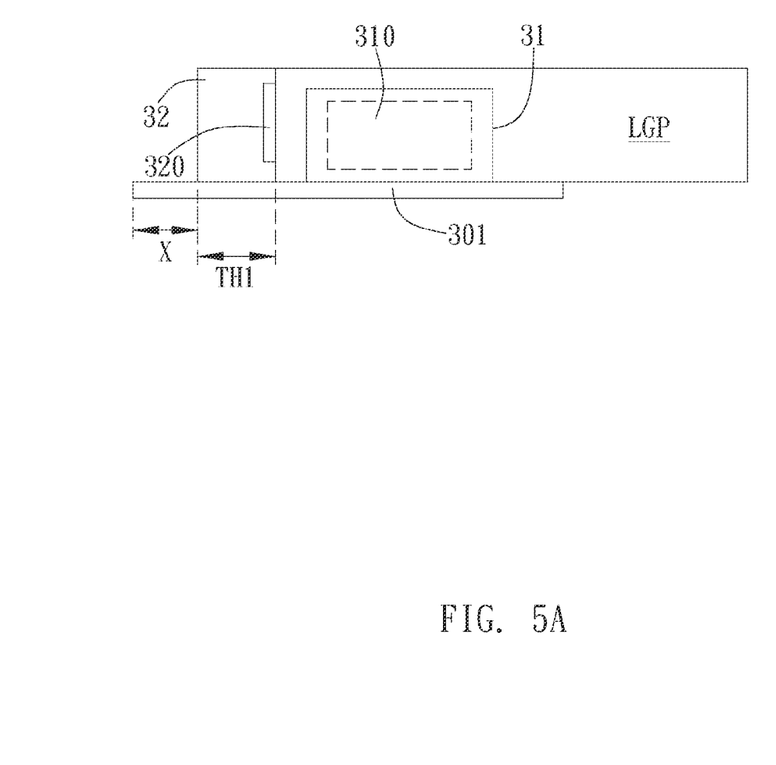
FIG. 5A illustrates the value of B when the side-view LED is used as the second light source.
Figure 5B:
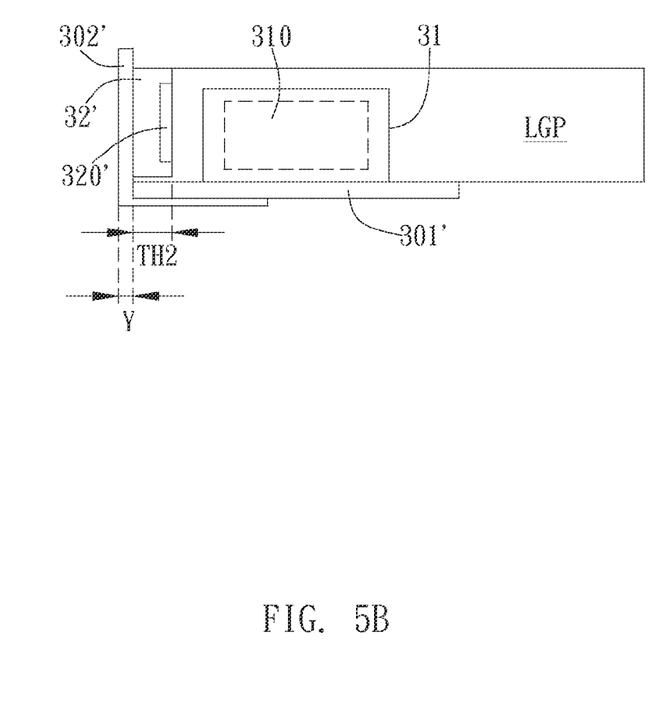
FIG. 5B illustrates the value of B when the top-view LED is used as the second light source.
Figure 5C:
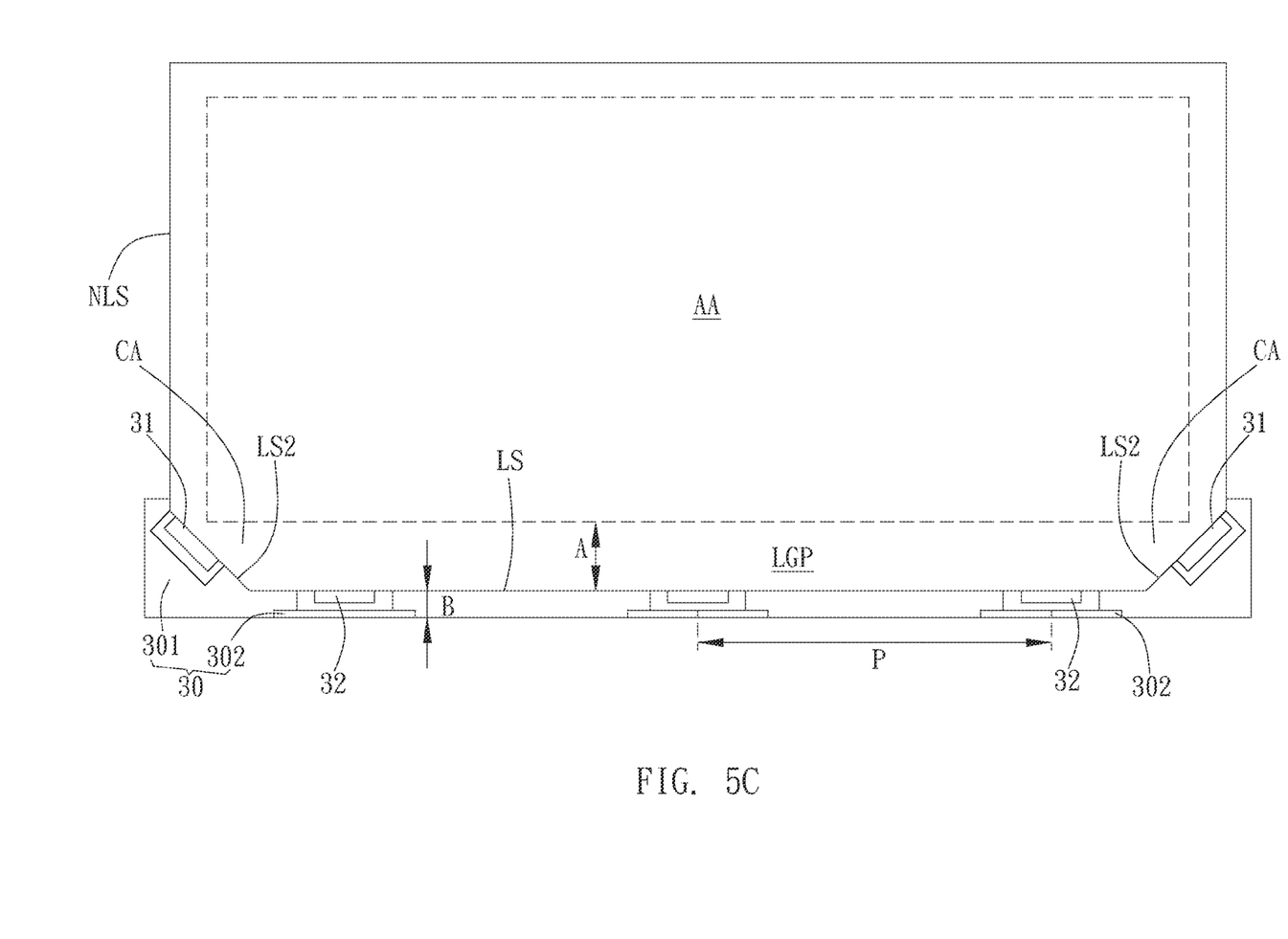
FIG. 5C illustrates a schematic diagram of the distance A from the active area to the top of the light emitting surface of the second light source and the distance B from the top of the light emitting surface of the second light source to the bottom.

In addition, compared to the side-view LED, the top-view LED can increase the value of A in the A/P ratio, therefore, the hot spot phenomenon formed by the LEDs due to the uneven intensity of incident lights can be avoided, wherein A is the distance between the active area AA and the light incident side LS of the light guiding plate LGP shown in FIG. 5C; P is the pitch length of the light source (the distance between two centers of second light sources 32). For example, the side-view LED is used as the second light source 32 shown in FIG. 5A, and the top-view LED is used as the second light source 32' shown in FIG. 5B. As shown in FIG. 5C, the light guiding plate LGP has a non-light incident side NLS, light incident sides LS, LS2, and corner areas CA located at two ends of the light incident side LS. The light incident side LS2 is located between the light incident side LS and the non-light incident side NLS. The first light source 31 corresponds to the light incident side LS2, and the second light source 32 corresponds to the light incident side LS.

It is assumed that A is the distance between the active area AA and the light incident side LS of the light guiding plate LGP, and B is the distance between the light incident side LS of the light guiding plate LGP and the bottom of the second light source 32, and A+B is the distance between the active area AA and the bottom of the second light source 32, namely the length/range of the display. The value of B obtained in FIG. 5A equals to the height TH1 of the second light source 32, and the value of B obtained in FIG. 5B equals to the sum of the thickness Y of the second substrate portion 302 (is is assumed to be 0.2) and the height TH2 of the second light source 32'. Because the height TH1 of the side-view LED used as the second light source 32 in FIG. 5A is about 1.5, and the height TH2 of the top-view LED used as the second light source 32' in FIG. 5B is about 0.8, that is to say, TH2 is much smaller than TH1, so that the value of B obtained in FIG. 5B (0.2+0.8=1) is smaller than the value of B obtained in FIG. 5A (1.5). If the length/range of the display is fixed, namely A+B is constant, the value of A in FIG. 5B will be larger than the value of A in FIG. 5A, therefore, the value of A in the A/P ratio will be increased; in other words, the space provided for mixing lights will be increased to reduce the hot spot phenomenon formed by the LEDs.

In addition, after the second light source 32' in FIG. 5B is bent above the first substrate portion 301', not only the original edge space above the first substrate portion 301' can be effectively used, but also the original reserved space rear the second light source 32 in FIG. 5A (namely the length X of a section of protruding circuit board) can be saved; therefore, the effect of saving space can be achieved.

Figure 6:
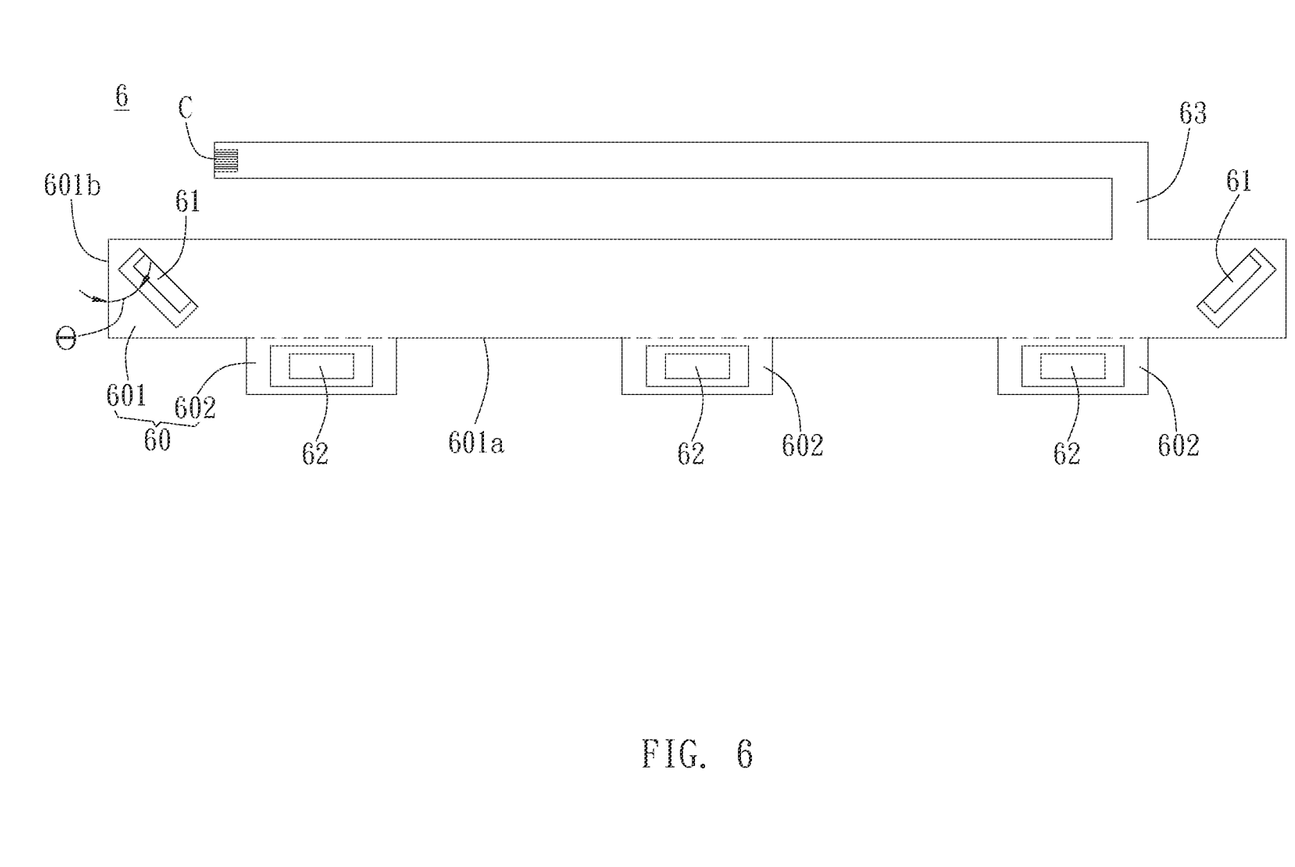
FIG. 6 illustrates a top view of the light source module in the second preferred embodiment of the invention.

A second embodiment of the invention is also a light source module. Please refer to FIG. 6. FIG. 6 illustrates a top view of the light source module in this embodiment. Different from the first embodiment of the invention, in the light source module 6, the first substrate portion 601 and the second substrate portion 602 of the substrate 60 are formed by the same flexible substrate to enhance the utility of entire light source module 6, no matter the tolerance or the alignment accuracy can be enhanced. For example, the first substrate portion 601 and the second substrate portion 602 of the substrate 60 can be formed by the flexible printed circuit board with the thickness of 0.2 mm, but not limited to this.

Figure 7A:
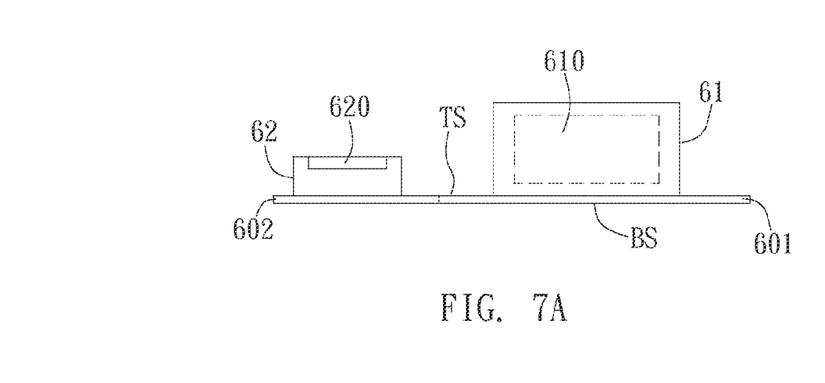
FIG. 7A illustrates a side view of the light source module shown in FIG. 6.
Figure 7B:
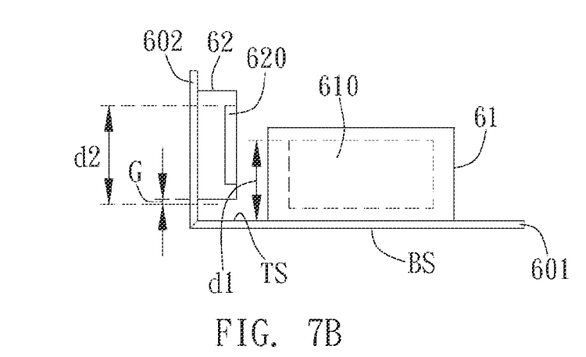
FIG. 7B illustrates a side view of the second substrate portion of FIG. 7A bent an angle relative to the first second substrate portion.

Please also refer to FIG. 7A and FIG. 7B. The same with FIG. 4A and FIG. 4B, the light source module 6 can adjust the height that the second light source 62 is disposed or adjust the gap G between the second light source 62 and the first substrate portion 601 to make the distance d2 between the top of the light emitting surface 620 of the second light source 62 and the bearing plate surface (the top surface TS) larger than the distance d1 between the top of the light emitting surface 610 of the first light source 61 and the bearing plate surface (the top surface TS).

Figure 8:
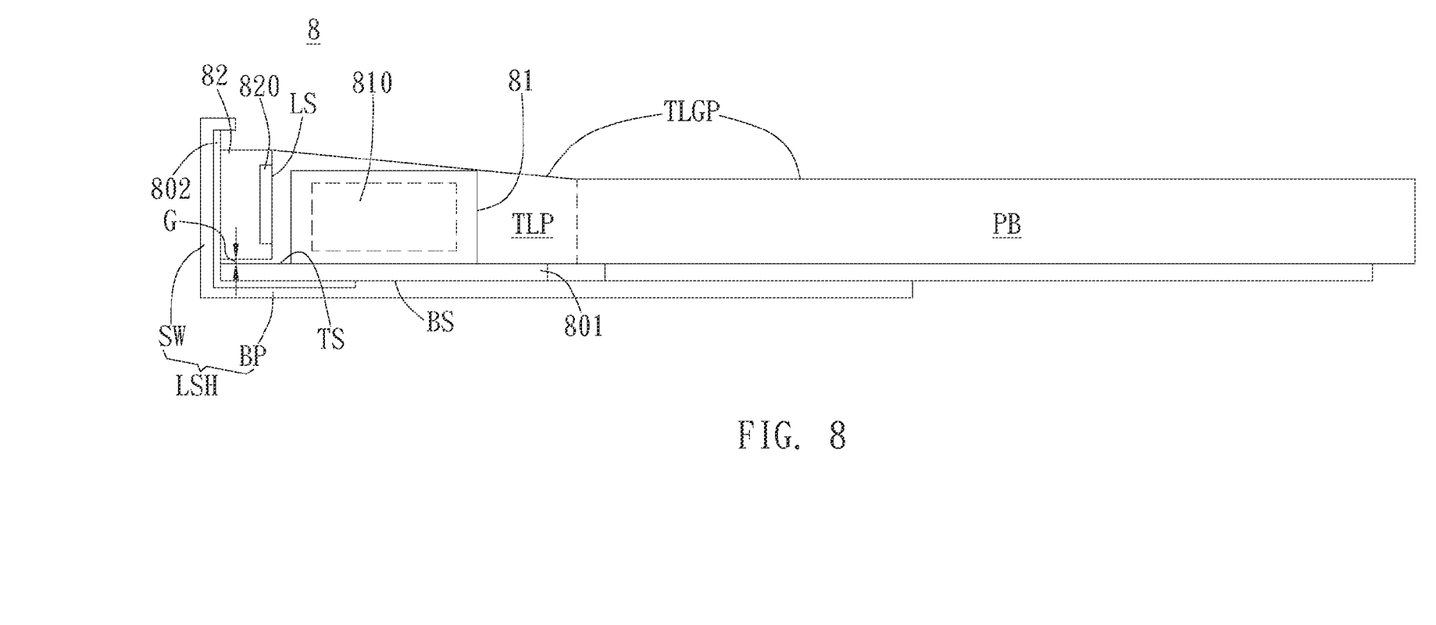
FIG. 8 illustrates a side view of the backlight module in the third preferred embodiment of the invention.

A third embodiment of the invention is a backlight module. As shown in FIG. 8, in this embodiment, the backlight module 8 includes a wedged light guiding plate TLGP and a light source module 80. Wherein, the wedged light guiding plate TLGP has a plate body PB and a wedged light incident unit TLP connecting with a side of the plate body PB. The wedged light incident unit TLP has the light incident side LS opposite to the plate body PB. The thickness of the wedged light incident unit TLP is decreasing from the light incident side LS to the plate body PB. That is to say, the thickness the wedged light incident unit TLP is thickest at the light incident side LS, and the thickness of the wedged light incident unit TLP is thinnest at the position connecting to the plate body PB. The first light source 81 faces toward a thinner position in the wedged light incident unit TLP, and the second light source 82 faces toward a thicker position in the wedged light incident unit TLP. In other words, the first light source 81 is disposed in the wedged light incident unit TLP, namely between the light incident side LS and the plate body PB, and the second light source 82 is disposed at the light incident side LS. The first substrate portion 801 extends along the light incident side LS. The first light source 81 generates lights incident to the corners of the wedged light guiding plate TLGP at two ends of the light incident side LS, and the second light source 82 generates lights incident to the light incident side LS.

The same with FIG. 4A and FIG. 4B, the light source module 80 can adjust the height that the second light source 82 is disposed or adjust the gap G between the second light source 82 and the first substrate portion 801 to make the distance d2 between the top of the light emitting surface 820 of the second light source 82 and the bearing plate surface (the top surface TS) larger than the distance d1 between the top of the light emitting surface 810 of the first light source 81 and the bearing plate surface (the top surface TS). Because the wedged light guiding plate TLGP is used in the backlight module 8, and the second light source 82 faces toward a thicker position in the wedged light incident unit TLP, even the height that the second light source 82 is disposed is raised, the lights emitted from the second light source 82 can be still emitted into the wedged light incident unit TLP of the wedged light guiding plate TLGP smoothly to enhance the light guiding efficiency.

Figure 9:
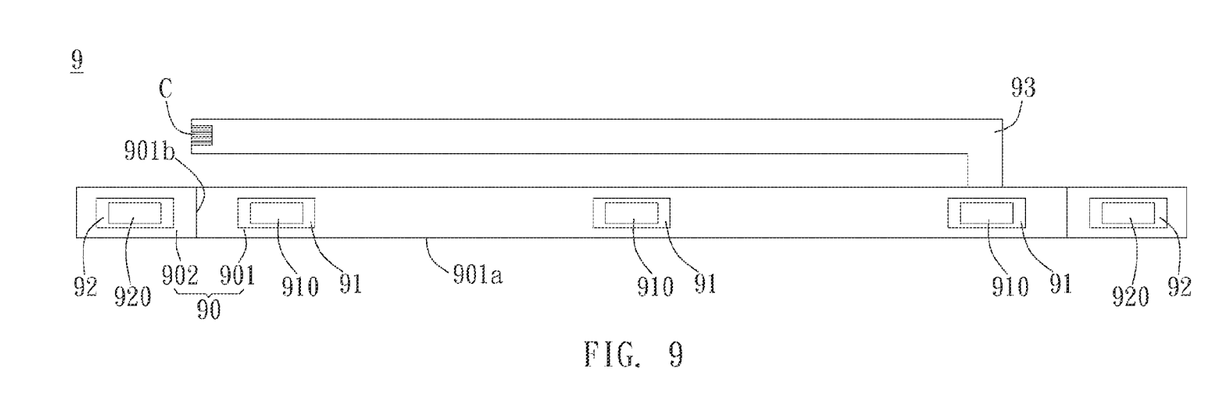
FIG. 9 illustrates a top view of the light source module in the fourth preferred embodiment of the invention.

A fourth embodiment of the invention is a light source module. As shown in FIG. 9, a substrate 90 of a light source module 9 includes a first substrate portion 901 and a second substrate portion 902. The first substrate portion 901 includes a long side 901a and a short side 901b which are connected. The second substrate portion 902 is disposed at the short side 901b of the first substrate portion 901 and it can be bent relative to the first substrate portion 901, so that the second substrate portion 902 is disposed at the end of the first substrate portion 901. In this embodiment, the first light source 91 and the second light source 92 are both top-view LEDs. The first light source 91 is disposed on the first substrate portion 901, and the second light source 92 is disposed on the second substrate portion 902. That is to say, the first light source 91 and the second light source 92 are disposed at the same side of the substrate 90. The light emitting surface 910 of the first light source 91 is parallel to the first substrate portion 901 and the light emitting surface 920 of the second light source 92 is parallel to the second substrate portion 902.

Figure 10:
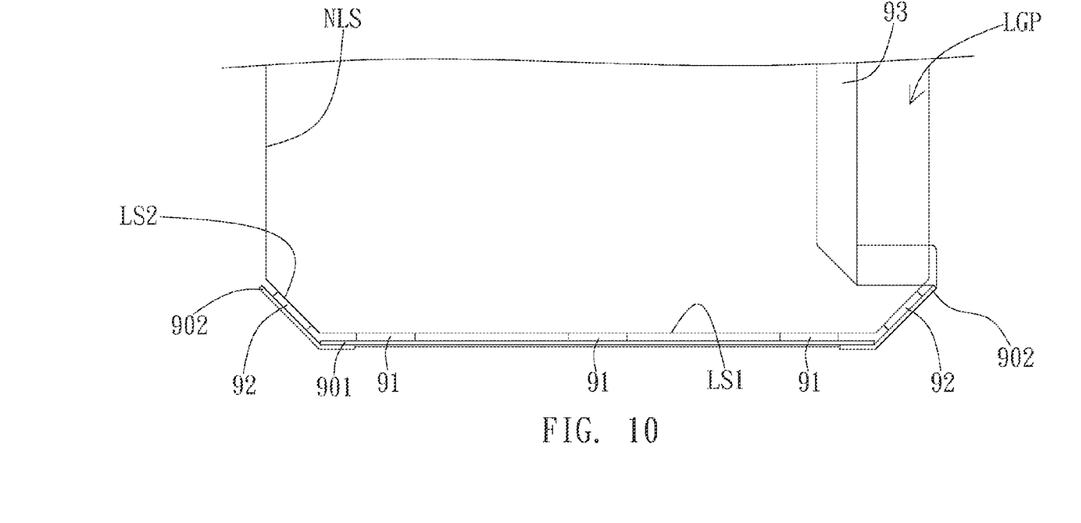
FIG. 10 illustrates a schematic diagram of the backlight module including the light source module of FIG. 9.

As the embodiment shown in FIG. 10, the second substrate portion 902 extends out of the short side 901b of the first substrate portion 901 and laegts bends an acute angle relative to the short side 901b. There exists the acute angle between the light emitting direction of the first light source 91 and the light emitting direction of the second light source 92. The first light source 91 corresponds to the first light incident side LS1 of the light guiding plate LGP, and the second light incident side LS2 corresponds to the second light incident side LS2 of the light guiding plate LGP. Wherein, the second light incident side LS2 of the light guiding plate LGP is located between the first light incident side LS1 and a non-light incident side NLS of the light guiding plate LGP. In this embodiment, the light guiding plate LGP has the first light incident side LS1 and the second light incident side LS2, and there exists an angle between the first light incident side LS1 and the second light incident side LS2. For example, the angle is an obtuse angle complementary to the acute angle of the second substrate portion 902 bent upward from the first substrate portion 901. In addition, the light guiding plate LGP also has the non-light incident side NLS connected with the second light incident side LS2; wherein there exists an angle between the non-light incident side NLS and the second light incident side LS2. In this embodiment, the angle between the second light incident side LS2 and the non-light incident side NLS is the same with the angle between the second light incident side LS2 and the first light incident side LS1, but not limited to this. The signal connection unit 93 is formed by extending the second substrate portion 902 to enhance the utility of the entire light source module. The signal connection unit 93 passes under the first substrate portion 901 and extends out of another side of the first substrate portion 901 to perform signal connection. In this preferred embodiment, the signal connection unit 93 is connected with the circuit on the first substrate portion 901 through the second substrate portion 902 to transmit signals for the first substrate portion 901 and the second substrate portion 902 at the same time. The signal connection unit 93 has a connecting end C.

As the embodiments shown in FIG. 9 and FIG. 10, the first substrate portion 901 is a hard substrate, and the second substrate portion 902 is a flexible substrate. For example, the first substrate portion 901 and the second substrate portion 902 can be structurally connected in a hot pressing way, and the signal connection and the electrical connection can be also done at the same time. However, the invention is not limited to this. The first substrate portion 901 can be a flexible substrate and the second substrate portion 902 is a hard substrate. With the different substrate combinations of different materials, the substrate of the light source module 9 can be adjusted to fit the light guiding plates with different forms of light incident surface, and the structural strength of the light source module 9 can be also taken into consideration.

Compared to the prior art, the backlight module and its light source module according to the invention can effectively improve the insufficient brightness in the middle region of the conventional backlight module by using a side-view LED and a top-view LED mixedly or substrate combination. In addition, because the thinner top-view LED is used in the backlight module and its light source module of the invention, the value of A in the A/P ratio can be also increased, and the hot spot phenomenon formed by the LEDs due to the uneven intensity of incident lights.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A light source module, comprising:
   a substrate, comprising a first substrate portion and a second substrate portion, wherein the first substrate portion extends along a length direction, and the second substrate portion bends first angle relative to an extending surface of the first substrate portion;
   two first light sources, disposed on the first substrate portion; and
   at least one second light source, disposed on the second substrate portion;
   wherein a second angle between light-emitting directions of the first light source and the second light source equals to the first angle, and the light-emitting directions are parallel to the first substrate portion, a first light emitting surface of the first light source and a second light emitting surface of the second light source are not parallel to each other, first light emitting surfaces of the two first light sources are not parallel to each other, and the second light source is located between the two first light sources.

2. The light source module of claim 1, wherein the first substrate portion is a hard substrate or a flexible substrate, and the first substrate portion has a long side and a short side which are connected; the second substrate portion is a flexible substrate and added to connect with the first substrate portion.

3. The light source module of claim 2, wherein the second substrate portion is connected with a surface of the first substrate portion opposite to the first light source, and the second substrate portion is bent toward another surface of the first substrate portion the first light source is disposed.

4. The light source module of claim 2, wherein the second substrate portion is bent from the long side of the first substrate portion and stands on a bearing plate surface of the first substrate portion used for bearing the first light source, and the second light source is also located above the bearing plate surface.

5. The light source module of claim 4, wherein the first light source is a side-view light-emitting diode (LED), the first light source is disposed on a position of the bearing plate surface closer to a short side end than the second substrate portion, and there is an acute angle between the first light source and the short side end; the second light source is a top-view light-emitting diode (LED); there is the acute angle between light emitting directions of the first light source and the second light source, and the light emitting directions of the first light source and the second light source are both parallel to the bearing plate surface of the first substrate portion.

6. The light source module of claim 5, wherein the second light emitting surface of the second light source is higher than the first light emitting surface of the first light source, so that the distance between the top of the second light emitting surface of the second light source and the bearing plate surface is larger than the distance between the top of the first light emitting surface of the first light source and the bearing plate surface.

7. The light source module of claim 5, wherein there is a gap between the second light source and the first substrate portion, so that the distance between the top of the second light emitting surface of the second light source and the bearing plate surface is larger than the distance between the top of the first light emitting surface of the first light source and the bearing plate surface.

8. The light source module of claim 2, further comprising a signal connection unit formed by extending from the second substrate portion.

9. The light source module of claim 2, wherein the second substrate portion is extended from a short side end of the first substrate portion, and the second substrate portion is bent the first angle relative to the short side end.

10. The light source module of claim 9, wherein the first light source and the second light source are both top-view light-emitting diode (LED); there is the first angle between light emitting directions of the first light source and the second light source.

11. The light source module of claim 1, wherein the first substrate portion and the second substrate portion are formed by a flexible substrate, the second substrate portion is extended from a long side of the first substrate portion and bent to stand on a bearing plate surface of the first substrate portion used for bearing the first light source, and the second light source is also located above the bearing plate surface.

12. The light source module of claim 11, wherein the first light source is a side-view light-emitting diode (LED), the first light source is disposed on a position of the bearing plate surface closer to a short side end than the second substrate portion, and there is an acute angle between the first light source and the short side end; the second light source is a top-view light-emitting diode (LED); there is the acute angle between light emitting directions of the first light source and the second light source, and the light emitting directions of the first light source and the second light source are both parallel to the bearing plate surface of the first substrate portion.

13. The light source module of claim 12, wherein a second light emitting surface of the second light source is higher than a first light emitting surface of the first light source, so that the distance between the top of the second light emitting surface of the second light source and the bearing plate surface is larger than the distance between the top of the first light emitting surface of the first light source and the bearing plate surface.

14. The light source module of claim 12, wherein there is a gap between the second light source and the first substrate portion, so that the distance between the top of the second light emitting surface of the second light source and the bearing plate surface is larger than the distance between the top of the first light emitting surface of the first light source and the bearing plate surface.

15. A light source module, comprising:
  a substrate, comprising a first substrate portion and a second substrate portion, wherein the first substrate portion has a long side and a short side which are connected, and the second substrate portion is disposed at the long side or the short side, and the second substrate portion is bent relative to the first substrate portion;
  at least one first light source, disposed on a position of the first substrate portion closer to the short side than the second substrate portion, and there is an acute angle between the first light source and the short side; and
  at least one second light source, disposed on the second substrate portion, wherein a second light emitting surface of the second light source is parallel to the second substrate portion.

16. The light source module of claim 15, wherein there is an angle between a first light emitting surface of the first light source and the first substrate portion.

17. The light source module of claim 15, wherein a first light emitting surface of the first light source is parallel to the first substrate portion.

18. The light source module of claim 15, wherein there is an angle between a first light emitting surface of the first light source and a second light emitting surface of the second light source.

19. The light source module of claim 15, wherein the first light source and the second light source are disposed at the same side of the substrate.

20. A backlight module, comprising:
  a light guiding plate, having a non-light incident side, a first light incident side, and a second light incident side, and the second light incident side being located between the first light incident side and the non-light incident side;
  a substrate, comprising a first substrate portion and a second substrate portion, wherein the first substrate portion has a long side and a short side which are connected, and the second substrate portion is disposed at the long side or the short side, and the second substrate portion is bent relative to the first substrate portion;
  at least one first light source, disposed on the first substrate portion; and
  at least one second light source, disposed on the second substrate portion and abutted against the light guiding plate, and the first light source corresponding to the first light incident side, and the second light source corresponding to the second light incident side or the first light source corresponding to the second light incident side, and the second light source corresponding to the first light incident side.

* * * * *